US011806936B2

(12) United States Patent
Schalk et al.

(10) Patent No.: US 11,806,936 B2
(45) **Date of Patent: *Nov. 7, 2023**

(54) BUILD MATERIAL RECOVERY FOR A THREE-DIMENSIONAL (3D) PRINTER

(71) Applicant: Hewlett-Packard Development Company, L.P., Spring, TX (US)

(72) Inventors: Wesley R. Schalk, Vancouver, WA (US); Justin M. Roman, Vancouver, WA (US); Randall West, Vancouver, WA (US); Robert Lawrence Winburne, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,284

(22) Filed: May 5, 2022

(65) Prior Publication Data

US 2022/0266520 A1 Aug. 25, 2022

Related U.S. Application Data

(63) Continuation of application No. 16/075,487, filed as application No. PCT/US2017/043091 on Jul. 20, 2017, now Pat. No. 11,338,516.

(51) Int. Cl.

*B03B 1/00* (2006.01)
*B03B 1/02* (2006.01)
(Continued)

(52) U.S. Cl.

CPC ........ *B29C 64/357* (2017.08); *B29B 17/0005* (2013.01); *B29C 64/307* (2017.08);
(Continued)

(58) Field of Classification Search

CPC .... B03B 1/00; B03B 1/02; B07B 1/00; B07B 7/06; B22F 10/73; B29B 17/0005;
(Continued)

(56) References Cited

U.S. PATENT DOCUMENTS 7,828,022 B2 11/2010 Davidson et al.
7,887,316 B2 2/2011 Cox
(Continued)

FOREIGN PATENT DOCUMENTS

CN 204122757 1/2015
CN 104530472 4/2015
(Continued)

OTHER PUBLICATIONS

How Much Metal 3d Printing Powder Can You Recycle, Jul. 27, 2016 <http://www.makepartsfast.com/how-much-metal-3d-printing-powder-can-you-recycle/>.

*Primary Examiner* — Leo B Tentoni
(74) *Attorney, Agent, or Firm* — SHOOK, HARDY & BACON L.L.P.

(57) ABSTRACT

A build material recovery system for a three-dimensional (3D) printer can include a selective solidification device to create a 3D object using build material, a build processing device to separate the 3D object from unfused build material, a material separating and conditioning device to condition the unfused build material, and a material storage device to store the conditioned build material.

20 Claims, 3 Drawing Sheets

(51) Int. Cl.

| | |
|---|---|
| ***B07B 1/00*** | (2006.01) |
| ***B07B 7/06*** | (2006.01) |
| ***B22F 10/73*** | (2021.01) |
| ***B29C 64/153*** | (2017.01) |
| ***B29C 64/165*** | (2017.01) |
| ***B29C 64/357*** | (2017.01) |
| ***B29C 64/307*** | (2017.01) |
| ***B33Y 40/20*** | (2020.01) |
| ***B29B 17/00*** | (2006.01) |
| ***B33Y 40/00*** | (2020.01) |
| ***B33Y 40/10*** | (2020.01) |
| *B33Y 10/00* | (2015.01) |

(52) U.S. Cl.
CPC ............... *B33Y 40/00* (2014.12); *B33Y 40/10* (2020.01); *B33Y 40/20* (2020.01); *B29B 2017/001* (2013.01); *B33Y 10/00* (2014.12)

(58) Field of Classification Search
CPC ............ B29B 2017/001; B29C 64/153; B29C 64/165; B29C 64/357; B33Y 40/20
USPC ............ 264/37.29; 425/78, 80.1, 174.4, 216, 425/217, 375, 436 R, 437, 447; 209/3, 209/10, 11, 233, 238
See application file for complete search history.

(56) References Cited

U.S. PATENT DOCUMENTS

| | | | |
|---|---|---|---|
| 8,827,681 | B2 | 9/2014 | Chen et al. |
| 2001/0045678 | A1 | 11/2001 | Kubo |
| 2002/0090410 | A1 | 7/2002 | Tochimoto et al. |
| 2010/0192806 | A1 | 8/2010 | Heugel et al. |
| 2017/0348771 | A1 | 12/2017 | Kawada |

FOREIGN PATENT DOCUMENTS

| | | |
|---|---|---|
| CN | 105170988 | 12/2015 |
| EP | 2 832 528 | 2/2015 |
| WO | WO-2015136277 A1 | 9/2015 |
| WO | WO-2016068899 A1 | 5/2016 |

BUILD MATERIAL RECOVERY FOR A THREE-DIMENSIONAL (3D) PRINTER

PRIORITY INFORMATION

This application is a continuation of U.S. National Stage application Ser. No. 16/075,487, filed on Aug. 3, 2018, entitled "Build Material Recovery for a Three-Dimensional (3D) Printer," and issued as U.S. Pat. No. 11,338,516, which claims priority to International Application No. PCT/US2017/043091, filed on Jul. 20, 2017, and entitled "Build Material Recovery for a Three-Dimensional (3D) Printer." The contents of which the foregoing applications are incorporated herein by reference in their entireties.

BACKGROUND

A three-dimensional (3D) printer may be used to create different 3D objects. 3D printers may utilize additive manufacturing techniques to create the 3D objects. For instance, a 3D printer may deposit material in successive layers in a selective solidification device of the 3D printer to create a 3D object. The material can be selectively fused, or otherwise solidified, to form the successive layers of the 3D object.

DETAILED DESCRIPTION

Figure 1:
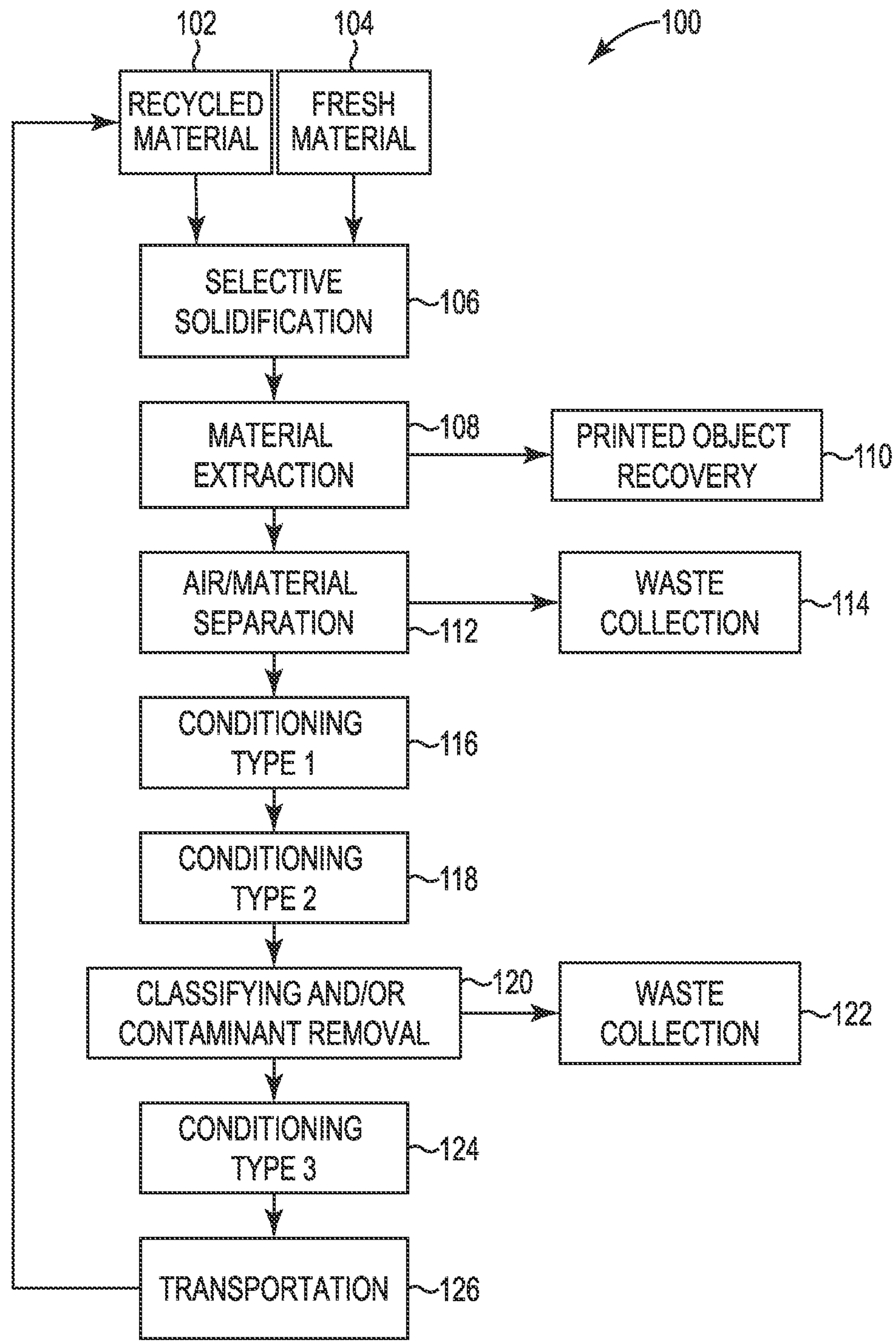
FIG. 1 illustrates an example of a method for build material recovery for a 3D printer consistent with the disclosure.

Some 3D printers can utilize a build material to create 3D objects. The build material can have a powdered and/or granular form. The 3D printer can apply build material in successive layers in a selective solidification device to create 3D objects. The build material can be selectively fused or solidified, and a next successive layer of build material can be applied to the selective solidification device.

As used herein, the term "3D printer" can, for example, refer to a device that can create a physical 3D object during a build process of the 3D printer. In some examples, the 3D printer can create the 3D object utilizing a 3D digital model. The 3D printer can create the 3D object by, for example, depositing a build material such as powder, and a binder material or fusing agent, in a selective solidification device of the 3D printer. As used herein, the term "selective solidification device" can, for example, refer to an area of the 3D printer in which a 3D object may be created. For instance, build material can be selectively solidified by the selective solidification device in a build chamber. The build chamber can be an area in which the 3D object is formed. The build material may be deposited in successive layers in the selective solidification device to create the 3D object. In some examples, a 3D printer can create the 3D object utilizing powder bed fusion, among other types of 3D printing. For example, "selective solidification" can refer to different types of 3D printing (and solidification of a 3D object, such as, for example selective heat sintering, selective laser sintering, binder jet solidification, stereolithography, digital light processing, thermal fusion and fusing agent, selective laser melting, electronic beam melting, or laminated object manufacturing, among others.

In some examples, not all of the build material supplied to the selective solidification device of the 3D printer may be utilized during a build process of a 3D object in the 3D printer. For instance, build material supplied to the selective solidification device can form part of a 3D object or can be used during the 3D printing process by may not be solidified. For example, incidental build material may be airborne and/or may fall outside the area of a build platform during the build process, and/or there may be excess build material left over at the end of the build process. The incidental and/or excess build material may be reused during the same build process and/or in a subsequent build process when recovered from the selective solidification device. As used herein, incidental and/or excess build material can be referred to as "unfused or unsolidified build material."

Some approaches to recovering the unfused build material include removing a receptacle (e.g., a "build unit") containing the 3D object, and manually removing the unfused build material. For instance, a user may manually sift through the build and unfused build material removing the 3D object from the unfused build material. The unfused build material can be manually placed elsewhere for use in a future build or disposed of.

Build material recovery in accordance with the present disclosure can include a build material recovery system for a 3D printer integrated within the 3D printer. For instance, some examples can include recovering unfused build material during and/or after a build process, recycling the recovered build material, and providing the recycled build material to a selective solidification device of the 3D printer for use in an ongoing or a subsequent build process. The build material recovery system can recycle and condition the unfused build material for the use in the build process or store it for future use.

Such an example can reduce the quantity lost build material, contaminated build material (e.g., contaminated by bugs, hair, other build material, etc.), and human exposure to build material. Further, an example including conditioning of build material can result in an improved state of recycled build material, resulting in improved 3D objects.

FIG. 1 illustrates an example of a method 100 for build material recovery for a 3D printer consistent with the disclosure. At 102 and 104, recycled build material and/or fresh build material can be loaded into a selective solidification device for creation of a 3D object at 106. For instance, a mix of build material can be loaded into a selective solidification device. The mix can range, for example from 100 percent fresh build material to 100 percent recycled build material, with graduations in between.

As used herein, recycled build material includes build material recovered from a previous or current selective solidification process and fresh build material includes new build material that is not a result of recovery and/or recycling. Selective solidification can include the use of mixed recycled and fresh build material, just fresh build material, or just recycled build material. For instance, a particular mix ratio may be desired for a particular 3D object. Example mix ratios can include, but are not limited to: 100 percent fresh, 0 percent recycled; 20 percent fresh, 80 percent recycled; and 0 percent fresh, 100 percent recycled.

At 106, a 3D object can be created using selective solidification such as, for instance, selective heat sintering, selective laser sintering, binder jet solidification, stereolithography, digital light processing, thermal fusion/fused deposition modeling, selective laser melting, electronic beam melting, laminated object manufacturing, among others.

At 108, unfused build material can be extracted from the selective solidification device. For instance, unfused build material can be separated from the 3D object via a build processing device. In some examples, the build processing device can separate the 3D object from the unfused build material using airflow and/or vibration to extract the unfused build material from the selective solidification module. For instance, the airflow and/or vibration can occur for periods of time throughout the extraction process.

In some examples, the separation can include instances in which little to no air passes through holes at the bottom of the selective solidification device and/or a 3D printed object recovery zone. For instance, the holes can allow unfused build material to flow out of the selective solidification device and/or the 3D printed object recovery zone, but the air flow may not go through until the separation is complete. With respect to vibration, vibrating can move unfused build material around, allowing it to fall into the holes and be pulled through a transport device. The unfused build material can be transported to a material separating and conditioning device.

The 3D object can be recovered at 110. For instance, the 3D object, which can also be referred to as a printed object, can be retrieved from a 3D printed object recovery zone. The 3D printed object recovery zone can include a receptacle to house the 3D object. It can have a lid for users to lift for access to the 3D object, and in some examples the 3D printed object recovery zone can include task lighting and tools for cleaning the 3D object. In some instances, the 3D printed object recovery zone can include a platform that automatically lifts to present the 3D printed object. The 3D printed object recovery zone can include an airflow or vacuum source, in some examples, to collect unfused build material.

At 112, unfused build material can be separated from air using a material separating and conditioning device. In some examples, separation can include cyclonic separation or blow/settling box separation, among others. For example, unfused build material can be transported in an air stream for portions of a material cycle. In such an example, unfused build material from selective solidification device and/or the 3D printed object recover zone can be transported by pneumatics. In order to recover that unfused build material, the air/build material mix can be separated.

Subsequent to the separation, waste can be collected at 114. In some examples, particles may remain in the air stream. In such an example, a filter can be used to achieve desired separation (e.g., total separation). Those removed particles can be waste trapped in the filter, and as a result, do not end up in the recycled build material. A sieve, which can include a mesh screen for example, can process the recycled build material. What is left on the sieve is waste, while what passes through can be used as recycled build material. Examples of waste left on the sieve can include impurities such as fibers or hair, for instance.

The material separating and conditioning device can condition the unfused build material at 116, 118, and/or 124. Unfused build material can be conditioned to improve a state of the unfused build material and improve efficiency in a subsequent or same build process. Conditioning types 1, 2, and 3 can be the same or different conditioning types, and can include, for instance, cooling the build material, deionizing the build material, and adding or removing humidity from the build material, among others. Conditioning can result in desired properties of the unfused build material such as a desired size, shape, consistency, and/or neutral state (e.g., not electostatically charged). These properties can be specified for particular 3D objects in some examples.

At 120, the material separating and conditioning device can classify the unfused build material and/or remove contaminants from the unfused build material. Classification can include, for instance, removing particles within the unfused build material of a particular size. Put another way, particles within the unfused build material that are outside of a threshold (e.g., too large or too small) can be removed. The particles outside of the threshold may be undesired such that they can result in a defective build if used in the build process. In some examples, a sieve can be used during classification to separate the desired from the undesired particles. More than one sieve can be used in some examples. For instance different sieve sizes can be used to separate different particle sizes. The particles outside of the threshold can be collected and/or removed as waste at 122.

Conditioning at 116, 118, 124, and classification and/or contaminant removal at 120 can occur in different orders, and may not occur in the order illustrated in FIG. 1 in some examples. While three conditioning types and one classification and contaminant removal are illustrated in FIG. 1, more or fewer conditioning types, classifications, and/or contaminant removals can be utilized. A combination of conditioning, classification, and/or contaminant removal can be determined based on which combination results in the build process most efficient (e.g., desired state, size, texture, etc. of the build material).

At 126, subsequent to conditioning and/or contaminant removal, the unfused build material can be transported to a material storage device for storage of the unfused build material. The material storage device can include, for instance, a vessel or hopper or material cartridge to feed a selective solidification device for a 3D object.

Figure 2:
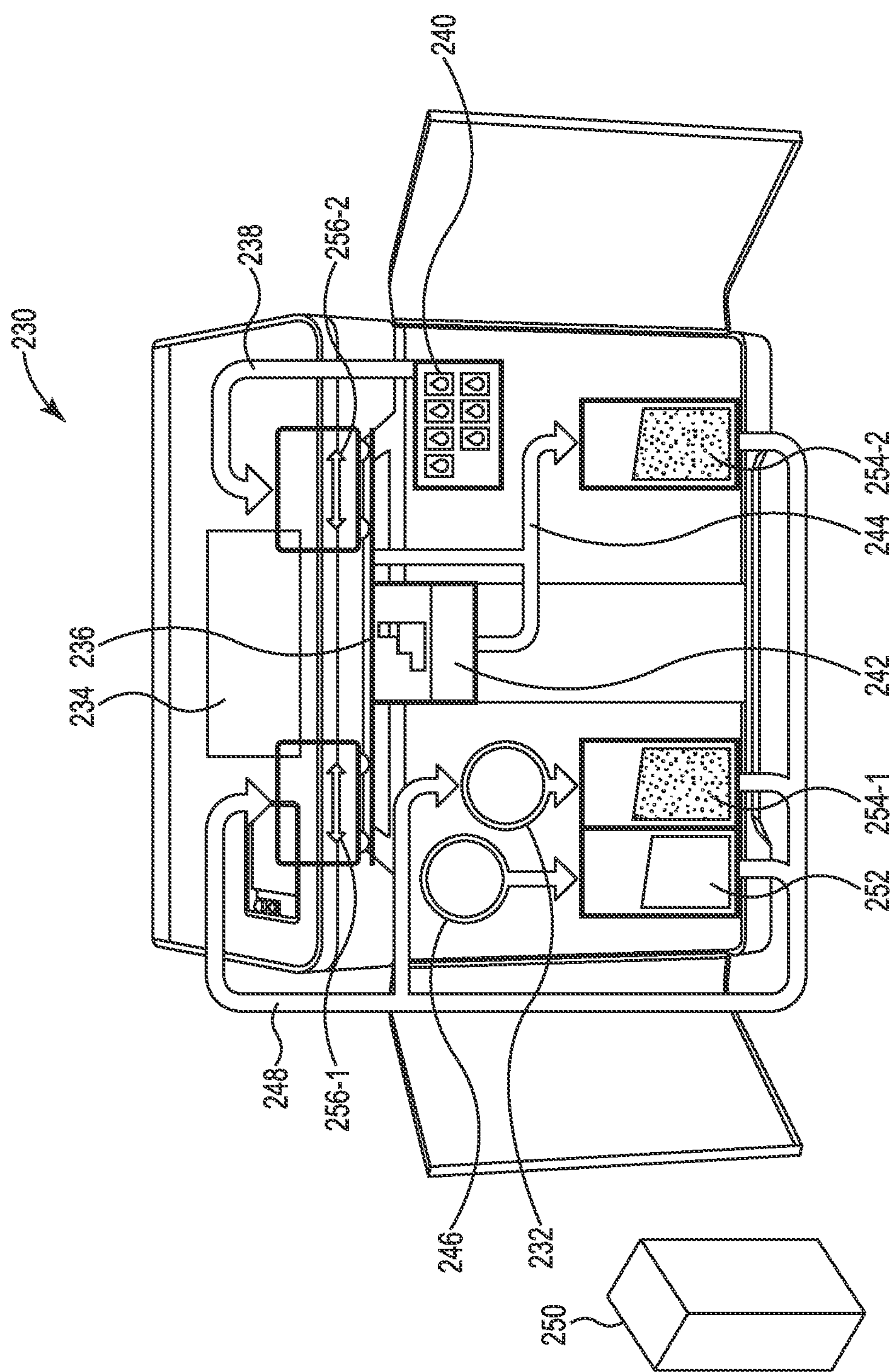
FIG. 2 illustrates an example of a build material recovery system for a 3D printer consistent with the disclosure.

FIG. 2 illustrates an example of a build material recovery system 230 for a 3D printer consistent with the disclosure. System 230 can be integrated within the 3D printer in some examples. For instance, system 230 can be at least partially contained within a housing of the 3D printer. In some examples, fresh and/or recycled build material and agents can be loaded (e.g., via cartridges) into system 230, and the 3D object, waste, unused build material, cartridges, vessels, hoppers or other products can come out of the 3D printer. Other products, waste, etc. can be collected and housed within system 230 and the 3D printer housing system 230.

System 230 can include selective solidification device 234 for creation of a 3D object using build material. Selective solidification device 234 can include carriages 256-1, 256-2, and a third carriage (not illustrated in FIG. 2) for use in creation of the 3D object, along with agent cartridges 240 (e.g., color agent cartridges, thermal agent cartridges, etc.). The third carriage can operate substantially orthogonal to carriages 256-1 and 256-2. Carriages 256-1 and 256-2 can be in-line with one another and can operate on a same track. In some examples, carriages 256-1 and 256-2 can work with the third carriage to create a 3D object. The third carriage can include a spreader used to spread build material during selective solidification. The carriages can be fed build material from material storage devices 252 and 254 and can be fed agents from agent cartridges 240 via an agent conveyance system 238 for use in a selective solidification process.

Carriage 256-1 can lay down build material (e.g., fed from material storage devices 252 and 254), and carriage 256-2 can house a print head for applying agents fed from agent cartridge 240. Carriages 256-1 and 256-2, along with the third carriage, can work in concert to fuse build material layer-by-layer until the 3D object is complete. For instance, carriage 256-1 can warm and spread layers of the build material while carriage 256-2 prints on the powder. During selective solidification, certain build material may not absorb energy, leaving it unfused (e.g., loose, unsolidified, powdery, etc.). Upon completion of the 3D object, unfused build material can be recovered for use in a future build or stored. In some examples, during selective solidification, unfused build material can be recovered and used in the current build (e.g., in-job reclamation). The recovery, in some examples, can be automatic such that it can be performed with limited or no user input and/or with limited or no prompting.

In some examples, selective solidification device can be enclosed during the selective solidification process, and an airflow or vacuum source can be present. In such an example, unfused (e.g., airborne) build material can be collected by the airflow or vacuum source for use in the current selective solidification process and/or a future selective solidification process.

System 230 can include fresh build material cartridge 246 and recycled build material cartridge 232. An example build material cartridge 250 is illustrated outside of system 230. Fresh build material cartridge 246 can house fresh build material that feeds fresh material to storage device 252. Recycled material cartridge 232 can house recycled build material that feeds one of two recycled material storage devices 254-1. The other recycled material storage device 254-2 can be fed directly from the build processing device 242 and material separating and conditioning device 244. While two recycled material storage devices 254 and one fresh material storage device 252 are illustrated, more or fewer may be present. When a build material cartridge 246, 232 has a low level of build material, what is remaining can be deposited into its respective build material storage device 252, 254-1, and the now-empty build material cartridge can be replaced with a full build material cartridge such as cartridge 250. This can prevent system 230 from running out of build material in the middle of a selective solidification process. In some examples, build material in build material storage devices 254 can be loaded into material cartridges, such as cartridge 250, for use in other systems, 3D printers, or 3D objects or stored for future builds. In some instances, build material cartridges 246, 232 can completely empty into an material storage devices 252 and 254-1, respectively.

The 3D object can be collected by a user from 3D printed object recovery zone 236. For instance, the 3D printed object recovery zone 236 can be an area where the 3D object is placed when completed, and a user can dust off the 3D object, view and examine the 3D object, etc. A base of the 3D printed object recovery zone 236 can have holes, in some examples, for unfused build material to fall through for the build material recovery process. 3D printed object recovery zone 236 can be enclosed until the 3D object is complete and a lid is lifted either manually or automatically.

Subsequent to the creation of the 3D object, build processing device 242 can be used to separate the 3D object from unfused build material. Build processing device 242 can use airflow and/or vibration to extract the unfused build material from selective solidification module 234 and/or 3D printed object recovery zone 236. For instance, air, vibration, or a combination of the two can be used to pull loose, unfused build material away from the 3D object. In some examples, build processing device 242, can subsequently transport the unfused build material to the material separating and conditioning device 244.

Material separating and conditioning device 244 can separate the unfused build material from air, remove particles of a size outside of a threshold, remove contaminants from the unfused build material, and/or condition the unfused build material prior to transport to material storage devices 254 or selective solidification device 234 or material cartridge 232. Conditioning can include, for instance, cooling, deionizing, de-agglomerating (e.g., milling, grinding, etc.), humidifying, and/or drying the build material, among others.

Material storage devices 254 can store the conditioned build material. Dosers on the bottom of each of build material storage devices 252, 254 can be used to feed a build in selective solidification device 234 via transport device 248. For example, system 230 can include transport device 248 that can work as a build material conveyance system to transport build material throughout system 230. Build material can be transported through system 230 pneumatically. For example, system 230 can include a pneumatic system for transporting build material between build material storage devices 252 and 254 and another pneumatic system for separation and extraction of unfused build material and vacuum functions including pulling air through holes in 3D printed recovery zone 236 or build processing device 242 during separation of fused and unfused build material.

The term "pneumatic" can, for example, refer to using gas, which may be pressurized, to exact work on a body. For example, pressurized gas may be utilized to move build material from one location to another location in the 3D printer. The pressured gas may be utilized to move the build material in piping included in the 3D printer. The piping can be part of build material transport system 248. As used herein, the term "gas" can, for example, refer to a substance which expands to fill an available space. Gas can be a gas mixture in some examples.

Transport device 248, in some examples, can transport conditioned, separated, decontaminated, and/or mixed build material from a material storage devices 254 to the selective solidification device 234 for use in a different build or stored in material cartridge 232. For instance, the build material can be transported to the third carriage for spreading during selective solidification. Transport device can include, for example, the pneumatic system as described above.

In some examples, recycled build material from material storage devices 254 can be mixed with fresh build material from material storage device 252 using transportation device 248. For instance, dosers at the bottom of material storage devices 254 and 252 can dose a particular amount (e.g., by volume, mass, etc.) of build material near-simultaneously such that the build materials can mix in transit to the selective solidification device 234. As used herein, near-simultaneously can include dosing without meaningful breaks or within a particular margin, range, and/or threshold time. The mixing can be done at a particular ratio, for instance at 80 percent recycled and 20 percent fresh. However, examples are not so limited. The build material used in a 3D object can be all fresh, all recycled, or a combination of the two The particular ratio can vary based on, for instance, a user's preferences, the type of 3D object, and/or availability of build materials, among others.

System 230 and the 3D printer housing can be an enclosed system including removable components such as build material cartridges 246 and 232, build material storage devices 252 and 254, and other portions of system 230 including filters, sieves, agents and agent cartridges, portions of the build processing device 242, portions of material separating and conditioning device 244, portions of selective solidification device 234, portions of 3D printed object recovery zone 236, and portions of transport device 248, among other components. These components may be removed for cleaning and/or servicing, or build material change, for instance.

Figure 3:
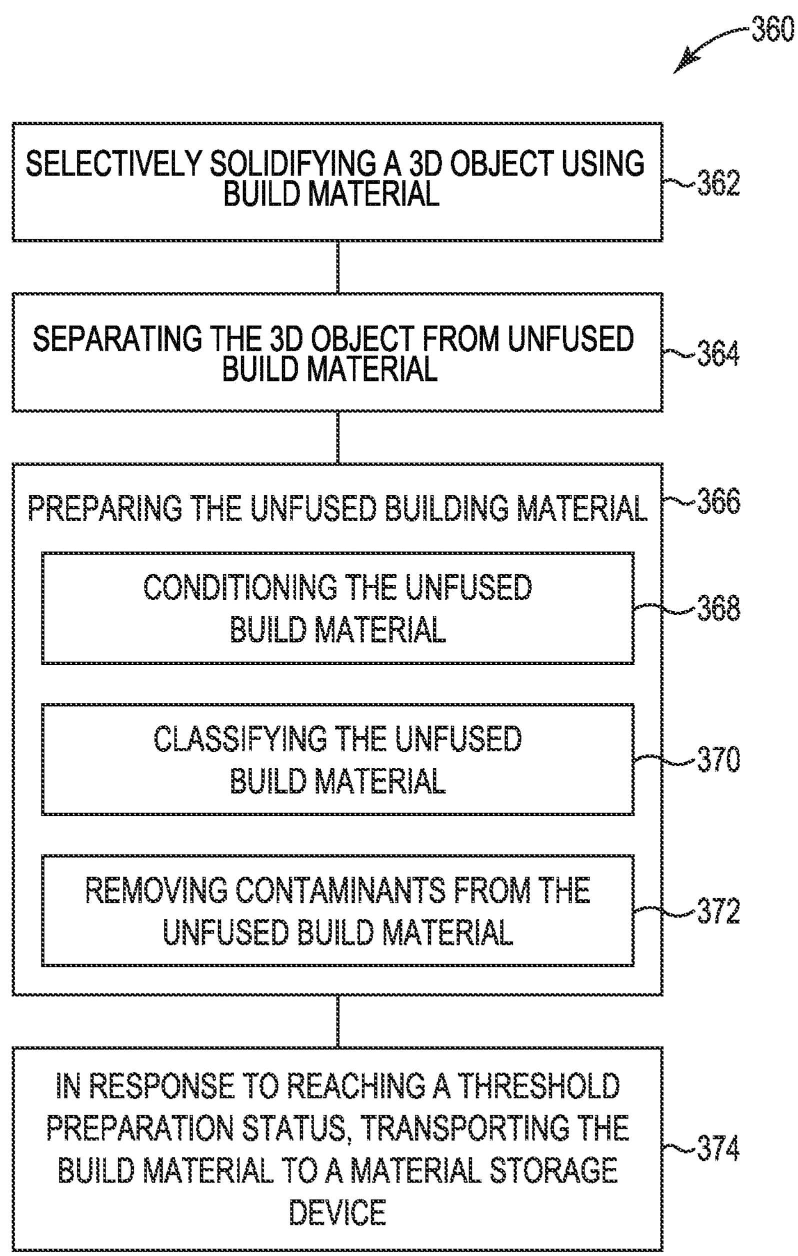
FIG. 3 illustrates another example of a method for build material recovery for a 3D printer consistent with the disclosure.

FIG. 3 illustrates another example of a method 360 for build material recovery for a 3D printer consistent with the disclosure. In some examples, method 360 can be performed automatically. Automatically, as used herein, can include method 360 being performed with limited or no user input and/or with limited or no prompting.

At 362, method 360 can include selectively solidifying a 3D object using build material. For instance, build material can be a mix of recycled and fresh build material, and at 364, method 360 can include separating the 3D object from unfused build material. In some examples, solidifying the 3D object can include using a particular ratio of recycled to fresh build material, and can in some examples include using only one of the types of build material. The unfused build material, in some examples, can be separated using a build process device and/or a material separating and conditioning device.

Method 360, at 366 can include preparing the unfused building material. Preparing the unfused build material can include iteratively conditioning the unfused build material at 368, classifying the unfused build material at 370, and removing contaminants from the unfused build material at 372. For example, the unfused build material can be conditioned, classified, and/or decontaminated until a desired threshold status (e.g., size, shape, texture, consistency, etc.) of the build material is met. In some examples, waste material can be collected subsequent to classifying the unfused build material and removing contaminants from the unfused build material. For instance, contaminants found in the build material can be removed as waste.

At 374, method 360 can include transporting the prepared build material to a material storage device in response to reaching a threshold preparation status. For instance, once the desired threshold status is met, the prepared build material can be transported via a transport device for use in selective solidification of a different 3D object or the same 3D object. In some examples, the prepared build material can be mixed with fresh build material during transport.

As used herein, "logic" is an alternative or additional processing resource to perform a particular action and/or element described herein. Logic may include hardware. The hardware may include processing resources such as circuitry, which are distinct from machine readable instructions on a machine readable media. Further, as used herein, "a" thing may refer to one, or more than one of such things. For example, "a widget" may refer to one widget, or more than one widget.

The figures follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A build material recovery device for a three-dimensional (3D) printer, comprising:

a material separating and conditioning device configured to iteratively, until a threshold preparation status is met:

condition unfused build material separated from a 3D object created at the printer; and classify the unfused build material.

2. The build material recovery device of claim 1, wherein the material separating and conditioning device is further configured to separate materials by separating the unfused build material from air.

3. The build material recovery device of claim 1, wherein the material separating and conditioning device is further configured to separate materials by removing particles exceeding a size threshold from the unfused build material.

4. The build material recovery device of claim 1, wherein the material separating and conditioning device is further configured to condition the unfused build material using at least one of cooling, deionizing, de-agglomerating, humidifying, and drying of the unfused build material.

5. The build material recovery device of claim 1, wherein the material separating and conditioning device is further configured to:

remove, from the unfused build material, contaminants introduced from outside sources; and collect waste material subsequent to removal of contaminants from the unfused build material.

6. The build material recovery device of claim 1, wherein the material separating and conditioning device is located within a build chamber with a selective solidification device and a build processing device.

7. The build material recovery device of claim 1, wherein the material separating and conditioning device is configured to recover the unfused build material as the unfused build material is separated from the 3D object.

8. A build material recovery system for a three-dimensional (3D) printer, comprising:

a material separating and conditioning device configured to iteratively, until a threshold preparation status is met:

condition the unfused build material;

remove, from the unfused build material, contaminants introduced from outside sources; and remove build material of a size outside the threshold preparation status from the unfused build material; and a transport device configured to:

mix the separated and conditioned build material with fresh build material at a particular ratio; and transport the mixed build material to a selective solidification device.

9. The build material recovery system of claim 8, wherein the selective solidification device is located within a build chamber with the material separating and conditioning device.

10. The build material recovery system of claim 8, further comprising a build material storage device configured to store the separated and conditioned build material prior to transportation.

11. The build material recovery system of claim 8, further comprising a build processing device configured to use airflow and vibration to separate a 3D object from the unfused build material.

12. The build material recovery system of claim 8, wherein the transport device is configured to transport build material throughout the build material recovery system pneumatically.

13. The build material recovery system of claim 8, further comprising material storage devices configured to dose the fresh build material.

14. The build material recovery system of claim 8, further comprising a 3D object recovery zone for 3D object recovery subsequent to the unfused material separation.

15. A method for build material recovery for a three-dimensional (3D) printer, comprising:

preparing unfused building material, comprising iteratively:

conditioning the unfused build material;

classifying the unfused build material; and removing, from the unfused build material, contaminants introduced from outside sources; and in response to reaching a threshold preparation status, transporting the prepared build material to a material storage device.

16. The method of claim 15, further comprising transporting prepared build material from the material storage device for use in selective solidification of a 3D object.

17. The method of claim 16, further comprising mixing the prepared build material with fresh build material during the transporting.

18. The method of claim 15, further comprising collecting waste material subsequent to classifying the unfused build material.

19. The method of claim 15, wherein the method is performed automatically.

20. The method of claim 15, wherein the conditioning the unfused build material comprises at least one of cooling, deionizing, de-agglomerating, humidifying, and drying of the unfused build material.

* * * * *